No. 11,561. PATENTED AUG. 22, 1854.
H. RICHARDSON, S. MORRIS, Jr. & B. C. PERRY.
FOLDING UMBRELLA.
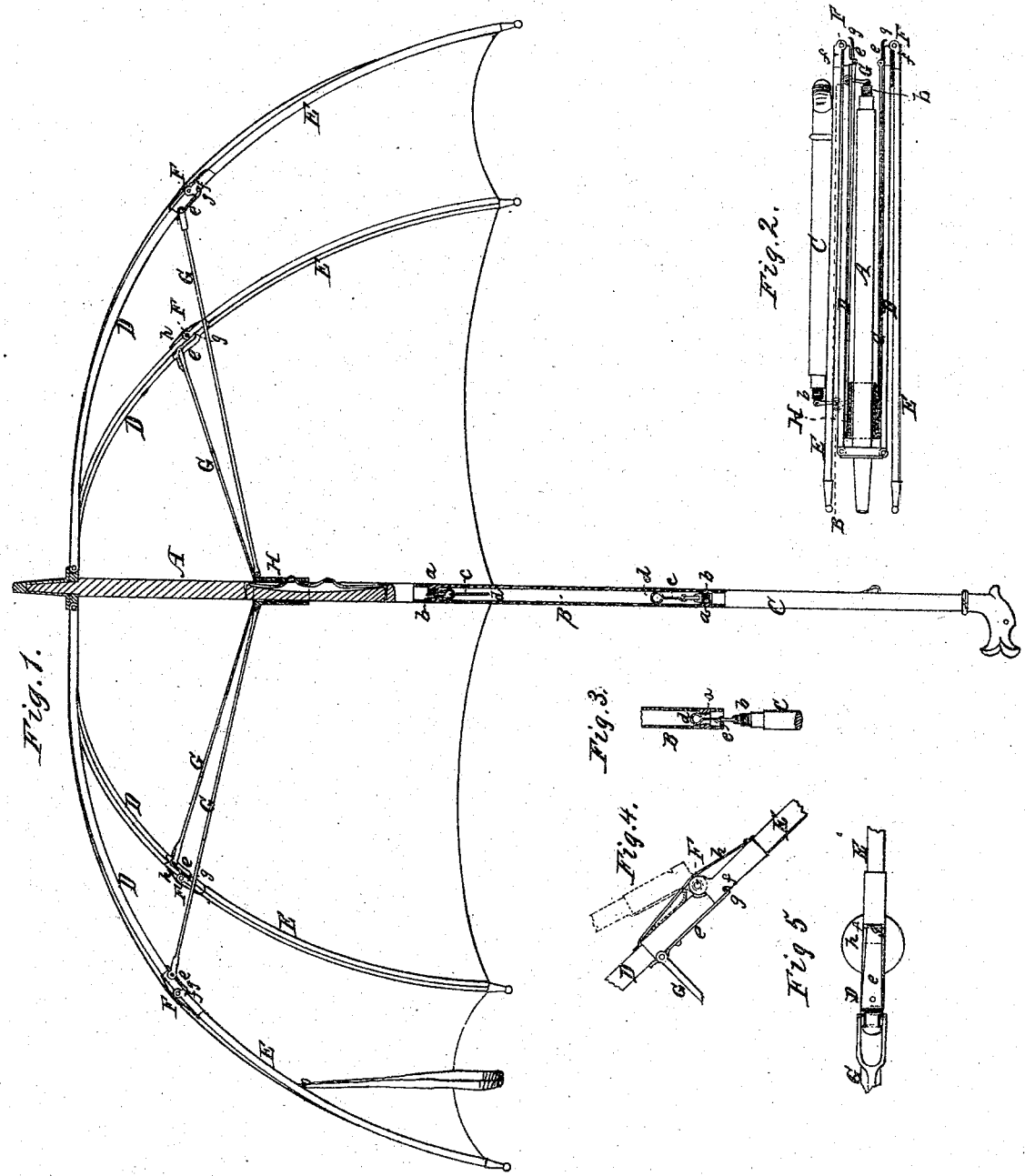

UNITED STATES PATENT OFFICE.

H. RICHARDSON, S. MORRIS, JR., AND B. C. PERRY, OF LITCHFIELD, CONNECTICUT.

FOLDING UMBRELLA.

Specification of Letters Patent No. 11,561, dated August 22, 1854.

*To all whom it may concern:*

Be it known that we, HENRY RICHARDSON, SELDEN MORRIS, Jr., and BENNET C. PERRY, all of Litchfield, in the county of Litchfield and State of Connecticut, have invented certain new and useful Improvements in Umbrellas; and we do hereby declare that the following is a full, clear, and exact description of the same, reference being had to the accompanying drawings, forming part of this specification, in which—

Figure 1, is a section of an umbrella, constructed according to our improvements; the same being shown open or spread. Fig. 2, is a section of the frame of the same, folded up. Fig. 3, is a section of one of the joints of the stick, showing it unfastened ready for folding. Fig. 4, is a side view, full size, of one of the joints in the ribs. Fig. 5, is an inside face view of the same.

Similar letters of reference indicate corresponding parts in each of the several figures.

The description of umbrella to which our invention relates is that whose ribs fold, and whose stick is jointed in pieces, for the purpose of enabling the umbrella to be carried in the pocket, or conveniently packed for traveling. Umbrellas of this kind have been before constructed; but our improvements are designed to make them more perfect and durable.

The first improvement relates to the hinge joints in the ribs, and consists in combining with each of the said hinge joints, a spring catch, of such form as will hold the joint firm, when the ribs are not folded, and will readily release the joint when it is desired to fold the rib.

The second improvement relates to the joints of the stick, of which the several pieces are screwed together, by means of a male screw, on one, and a nut on its next neighbor. It consists in making that part of each joint which contains the nut, hollow, for some distance behind or within the nut, and larger than the screw, and in attaching the part of the joint having the male screw to that having the nut, by means of links, one of which is made with a wing or boss, which is contained in the hollow part behind or within the nut, and is too large to pass through the nut; this serves to prevent the several pieces of the stick becoming detached from each other, when the joints are unfastened, and allows of the free turning of the screw, in fastening and unfastening the joints.

To enable those skilled in the art to make and use our invention, we will proceed to describe its construction and application.

A, B, C, are the joints of the stick, of which the center one, B, is formed of a metal tube, and has a nut, $a$, at a short distance within each end. The joints, A, and C, have each a male screw, $b$, fitting to one of the nuts, $a$, and which, if the joints are not made entirely of metal, form parts of metal caps. That part of the joint at the back of the screw fits into the end of the tube, outside the nut; and the two joints fit together with a shoulder, to make the joint steady. At the end of the screw, on each of the joints, A, and, C, a swivel is attached; and to the swivel is connected the link, $c$, which consists simply of a piece of wire, with an eye turned at each end; one eye to connect it with the swivel, which requires to pass through the nut, and a larger eye, $d$, to prevent the link passing through the nut. The eye, $d$, requires to be formed at the back of the nut, before the link or nut is put in the tube. The nut may be secured in the tube by soldering or otherwise.

The ribs are each formed in two joints, D, and, E, jointed by a hinge, F, whose pivot is at the outer side of the rib; and the outside joints, E, fold outward. The stays, G, connect with the inner joints, D, of the ribs, near the hinges. Each inner joint, D, has a flat steel spring, $e$, secured to its inner face; and the end of this spring is bent to form a small hook or catch, $g$, which enters a notch, $f$, cut across the inside of the outer joint. When the joints, D, and, E, are brought in line, the hook or catch, $g$, will snap into the notch, $f$, and hold the joint, rigid, the tension of the cloth when spread forming an additional means of security; but in bending or folding the rib, the spring yields easily. The hinge is covered by a piece of leather, $h$, which protects the cloth of the cover.

The umbrella, when spread, presents the same appearance as a common one, and is equally strong. To fold it, the slide, H, requires to be drawn down toward the handle, in the same way as that of a common umbrella, and then inverted, when, the cloth of the cover being slackened, the ribs may all be thrown back by a slight pressure of the hand. The slide is then moved up to the upper part of the stick. The joints of the stick next require to be unscrewed, and can be folded beside the ribs, as shown in Fig. 2. The whole may be placed in a neat case provided for the purpose. To spread it, the stick first requires to be screwed together, and then the slide drawn toward the handle. The stick then requires to be held upright, with the handle downward; and the outer joints of the ribs will fall into place by their own weight. When the slide is moved up, the tension of the cover will cause the ends of the joints to be brought close together; and the hooks, $g$, of the springs, $e$, will enter the notches, $f$, and make the ribs firm.

What we claim as our invention, and desire to secure by Letters Patent, is,

1. The improved combination of the spring, $e$, and its hook or catch, $g$, with the hinge, F; the said spring being secured to one part of the hinge or rib, and the hook or catch taking into a notch, $f$, in the other part of the hinge or rib; when the two parts of the rib are in line, for the purpose of making the joint rigid, substantially as set forth. We claim, that said improved combination, is much more easily made, and more efficient in its operation; also, that it is much cheaper of construction, both in material, and labor, and further that it is much neater in its finish.

2. Attaching the several joints, or parts, A, B, C, of the stick together, by means of a link, $c$, which is connected to the end of the male screw $b$, and has a ring, $d$, or equivalent, fitting in a hollow part behind or within the nut, $d$, which prevents its passing through the nut, but which, at the same time, allows the screw to turn freely within the nut, substantially as described. All former amendments are withdrawn.

HENRY RICHARDSON.
SHELDEN MORRIS, Jr.
BENNETT C. PERRY.

Witnesses:
H. R. CAIT,
GEO. C. WOODRUFF.